March 15, 1966 H. A. RUESCH ETAL 3,240,359
WORK TRANSFER DEVICE

Filed Oct. 23, 1963 7 Sheets-Sheet 4

INVENTORS.
HANNES A. RUESCH
LOUIS W. HAHN
BY
ATTORNEYS.

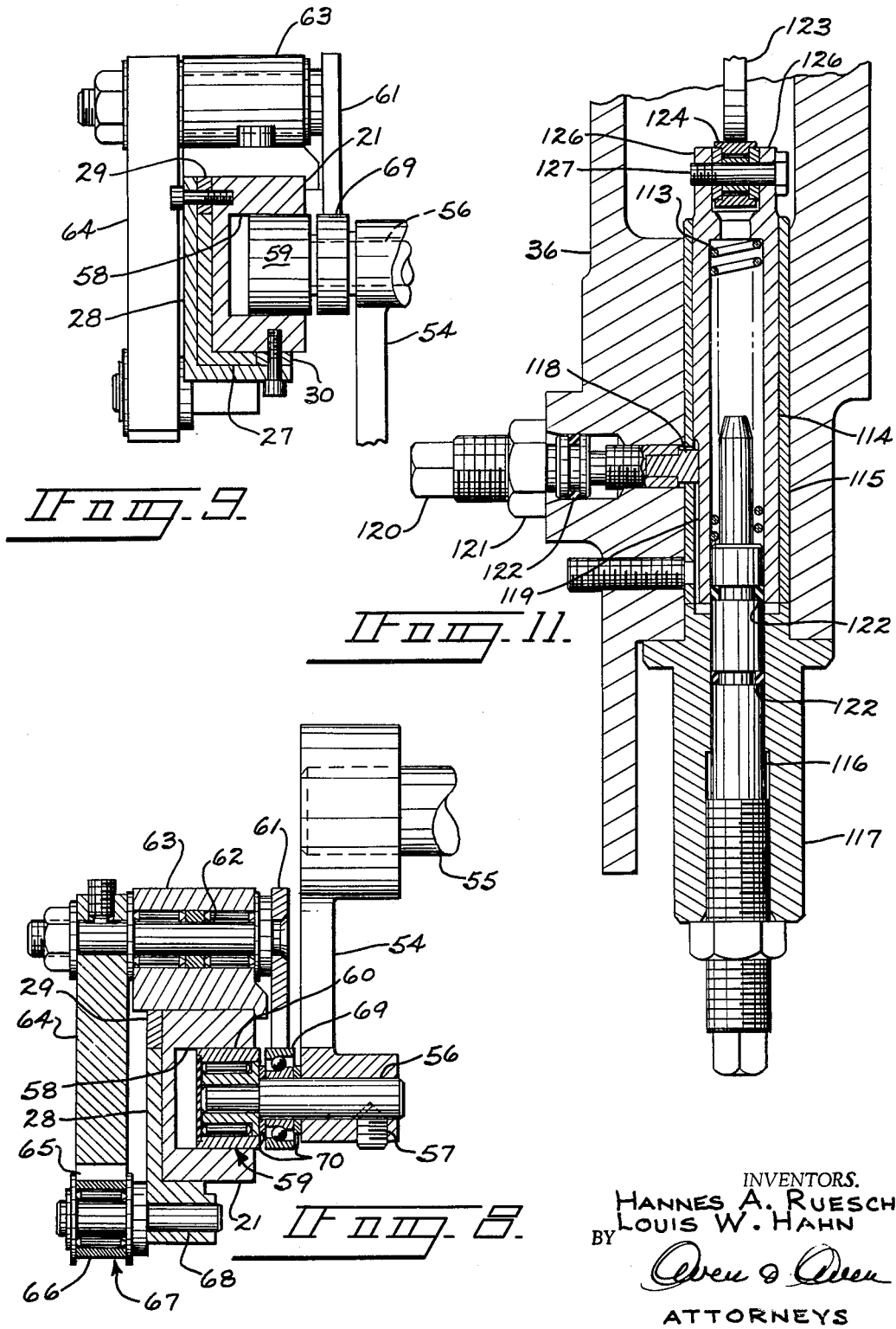

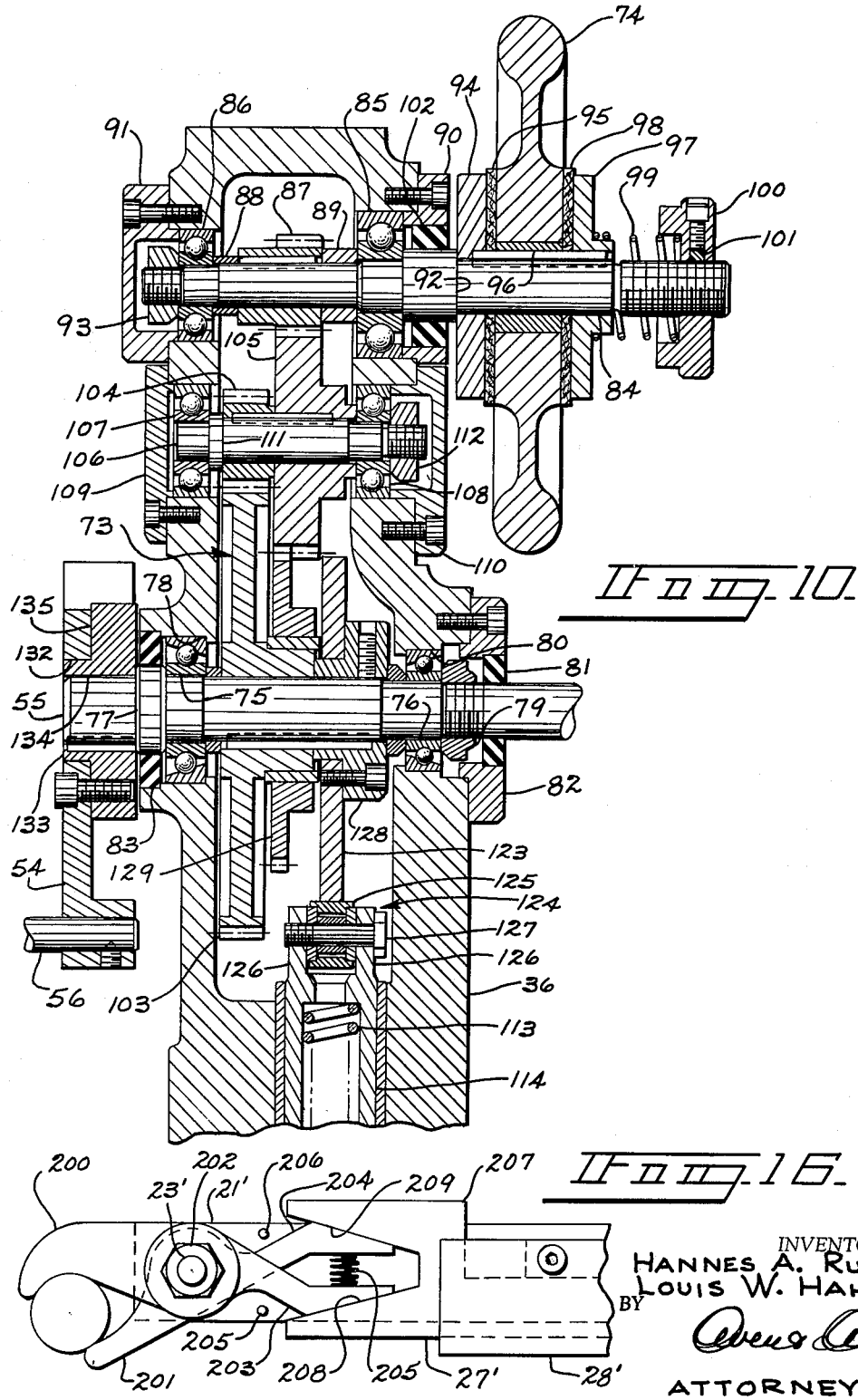

INVENTORS.
HANNES A. RUESCH
LOUIS W. HAHN
ATTORNEYS

United States Patent Office 3,240,359
Patented Mar. 15, 1966

3,240,359
WORK TRANSFER DEVICE
Hannes A. Ruesch, Zofingen, Aargau, Switzerland, and Louis W. Hahn, Detroit, Mich., assignors to Champion Spark Plug Company, Toledo, Ohio, a corporation of Delaware
Filed Oct. 23, 1963, Ser. No. 318,305
5 Claims. (Cl. 214—1)

The present invention relates to work transfer devices; and more particularly to a mechanical arm that picks up work pieces in one location and transfers them to another.

An object of the present invention is the provision of a new and improved mechanical arm having a finger and thumb which surround and grasp a work piece in one location, transfer the work piece to a second location, and then move apart from each other to release the work piece.

Another object of the present invention is the provision of a new and improved mechanical arm of the above described type which transfers the work piece from one position to another, in which spring, fly wheel and cam means are provided to offset the increased load on the device which occurs during the raising of the arm, and to prevent speeding up of the device during the lowering of the arm.

The invention resides in certain constructions and combinations and arrangements of parts, and further objects and advantages of the present invention will become apparent to those skilled in the art to which it relates from the following description of a preferred embodiment described with reference to the accompanying drawings forming a part of this specification, and in which:

FIG. 5 is a fragmentary view taken approximately on the line 5—5 of FIG. 3;

FIG. 6 is a fragmentary view similar to FIG. 5 showing the finger and thumb in a work releasing position;

FIG. 7 is a cross-sectional view taken approximately on the line 7—7 of FIG. 5;

FIG. 8 is a cross-sectional view taken approximately on the line 8—8 of FIG. 2;

FIG. 9 is a cross-sectional view taken approximately on the line 9—9 of FIG. 2 and rotated approximately 90°;

FIG. 10 is a cross-sectional view taken approximately on the line 10—10 of FIG. 2;

FIG. 11 is a fragmentary cross-sectional view taken approximately on the line 11—11 of FIG. 2;

FIG. 12 is a fragmentary cross-sectional view taken approximately on the line 12—12 of FIG. 2;

FIG. 16 is a fragmentary view of another embodiment of a work transfer arm.

Figure 4:
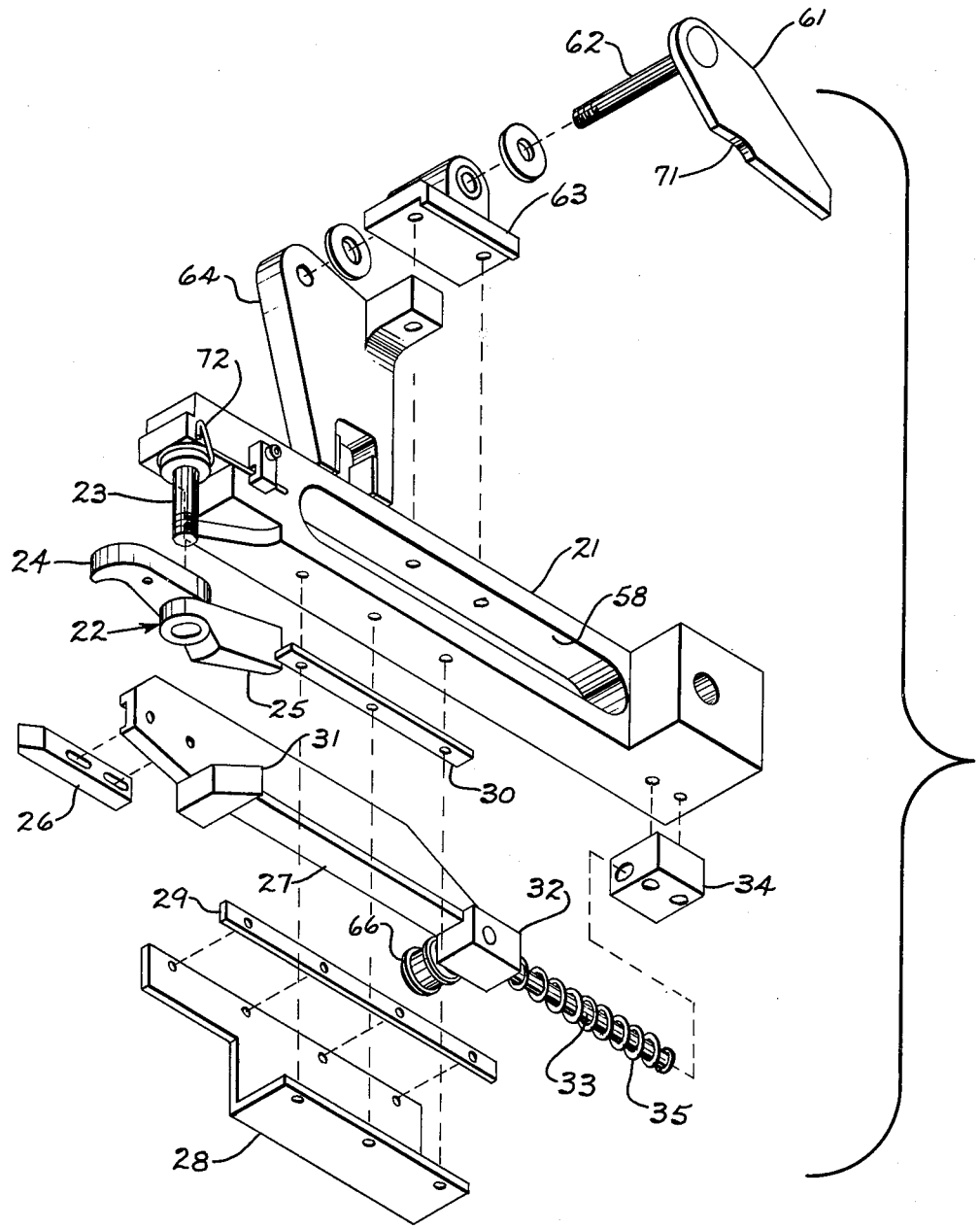
FIG. 4 is an exploded view of the parts of the work transfer arm.

The work transfer device 20 comprises an arm 21, see FIG. 4, having a work engaging lever 22 pivoted adjacent its center around a vertical pin 23 adjacent the outer end of the arm 21. The lever 22 has a front or outwardly projecting portion 24, which is hook shaped to extend partially around a work piece, and an inwardly projecting portion 25 adjacent the pivot pin 23. The portion 25 is cam shaped for actuation as will later be explained. The work pieces are picked up by engagement between the hook shaped portion 24 and a bar or thumb 26 which moves outwardly at the same time that the hook shaped portion moves toward the thumb 26. The thumb 26 is secured to the front end of a slide 27 having an L-shaped cross section and which is positioned against the bottom and one side surface of the arm 21. The slide 27 is held in place by a cover member 28 also having an L-shaped cross section and which fits over the slide 27 and is spaced from the arm 21 by means of side and bottom spacer members 29 and 30 respectively. The slide 27 has a cam projection 31 on its bottom side which engages the camming portion 25 of the lever 22 when the slide 27 is moved forwardly. The slide 27 includes a block 32 at its bottom rear surface from which a rearwardly extending rod 33 extends. The rod 33 projects into an aligned opening in a block 34 on the bottom rear of the arm 21, and the slide is normally biased outwardly to close the finger and the thumb by a coil spring 35 positioned about the rod 33 between the blocks 32 and 34.

The rear of the arm 21 is pivotably mounted at the side of a vertical gear box 36 by means of a horizontal pivot shaft 37 (see FIG. 12) which is journaled to the gear box 36 by inner and outer spaced anti-friction bearings 38 and 39 respectively. The inner race 40 of the outer anti-friction bearing 39 is clamped to the shaft 37 between and integral collar 41 and a hold down nut 42. The outer race 43 of the outer anti-friction bearing 39 is clamped between a shoulder 44 in the gear box 36 and an annular bearing retainer plate 45. The inner race 46 of the inner bearing 38 is clamped to the shaft 37 between a shoulder 47 and a hold down nut 48. The outer race 49 of the inner bearing 38 is free to slide axially along the sidewalls 50 of the bearing receiving opening 51. The projecting end of the shaft 37 is fitted into a horizontal opening 52 in the arm 21, and the arm is secured in place by a pair of set screws 53.

The arm 21 is swung about the horizontal pivot shaft 37 between a vertical and a horizontal position by means of a crank arm 54 (see FIG. 8) which is mounted on a drive shaft 55 which projects out of the gear box 36. The projecting end of the crank arm 54 is provided with a horizontal pin 56 which is held in place by a set screw 57. The pin 56 projects into a longitudinally extending horizontal groove 58 in the adjacent side of the arm 21, and an anti-friction bearing 59 is positioned on the pin 56 so as to engage the top and bottom surfaces of the groove 58. Upon rotation of the crank arm 54, the outer race 60 of the anti-friction bearing 59 rolls along the surfaces of the groove 58 to swing the arm 21 between its horizontal and vertical positions.

Figure 1:
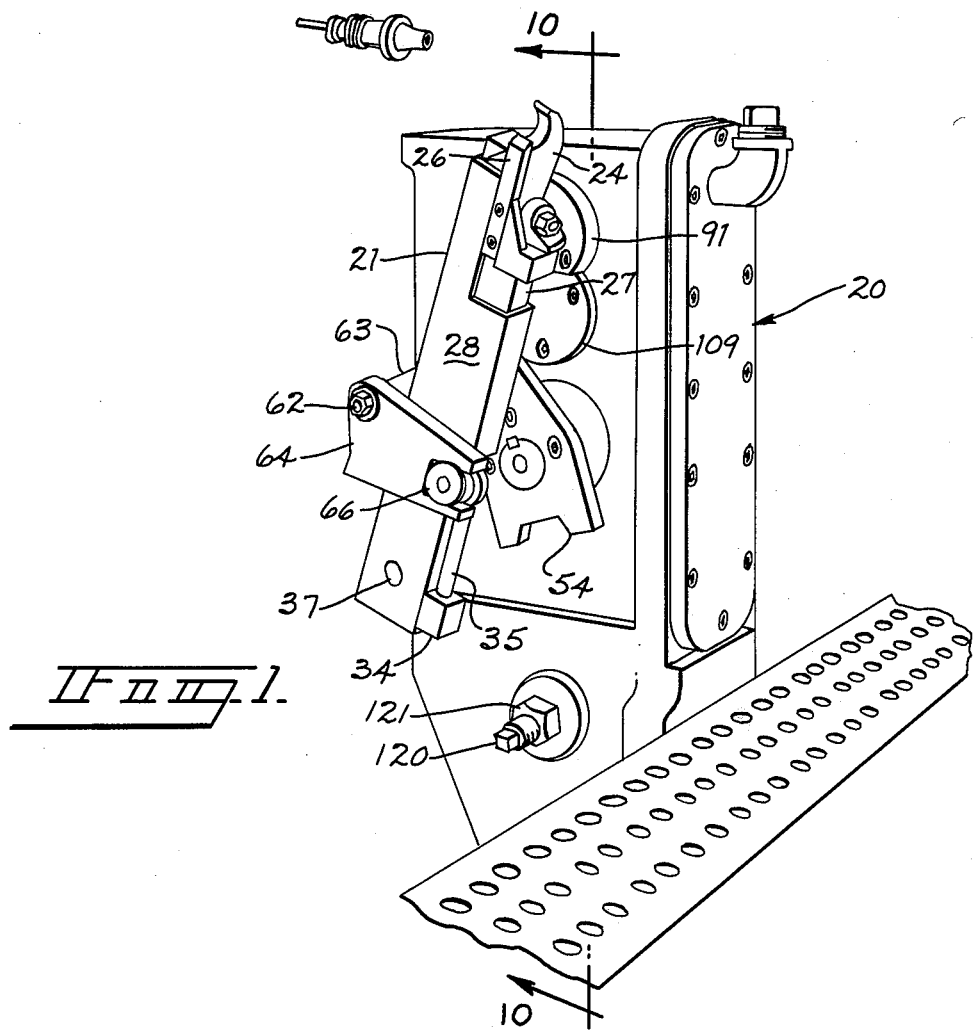
FIG. 1 is an isometric view of one embodiment of the present invention, and shows an arm which is used to transfer generally cylindrically shaped objects from a position above and behind the transfer device to the vertical openings in work holders carried by a moving conveyor positioned in front of and below the work transfer device.
Figure 2:
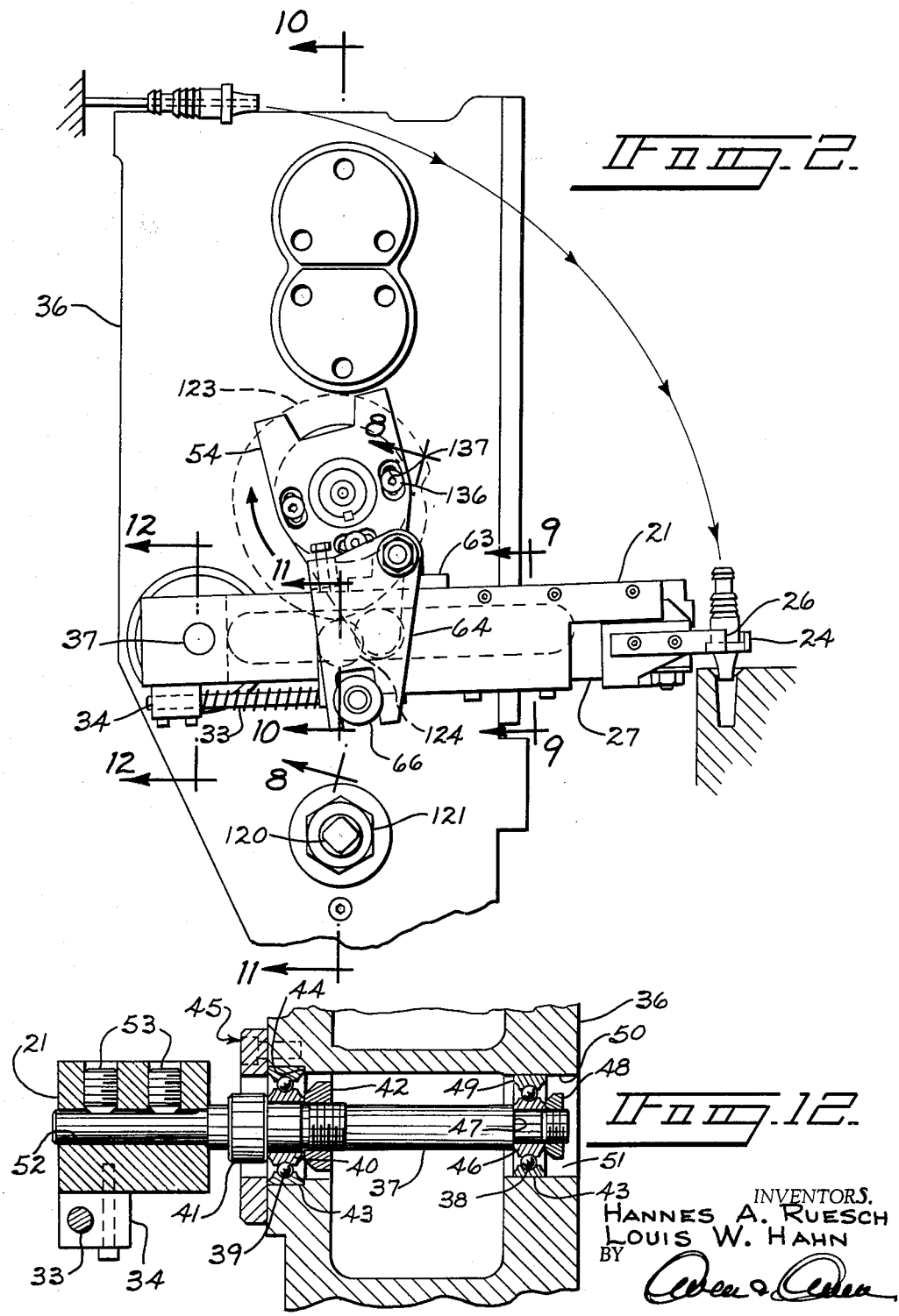
FIG. 2 is a side elevational view of the device of FIG. 1 showing its work transfer arm in a position wherein it places a work piece in the work holder of the conveyor; the view also shows a work piece at the loading station for the work transfer arm.

In the device shown in the drawing, the crank arm 54 is rotated clockwise as seen in FIGS. 1, 2, 13, 14 and 15. FIG. 2 of the drawings shows the arm 21 at approximately 2½° above its horizontal position. In the position shown in FIG. 2 the finger 24 and thumb 26 have just started to open to release a work piece to be placed in a work holder of a conveyor. The finger 24 and thumb 26 are opened upon rearward movement of the slide 27. The slide 27 is caused to move rearwardly by a cam plate 61, see FIG. 3, which is fixed to a horizontal cross shaft 62 that is journaled to a pillow block 63 bolted to the top of the arm 21. The outer end of the cross shaft 62 is keyed to a depending lever 64, see FIG. 4. The lower end of the lever 64 is slotted as at 65 to receive the outer race 66, see FIG. 8, of an anti-friction bearing 67 that is supported on a horizontal pin 68 which is pressed into the block 32.

Figure 3:
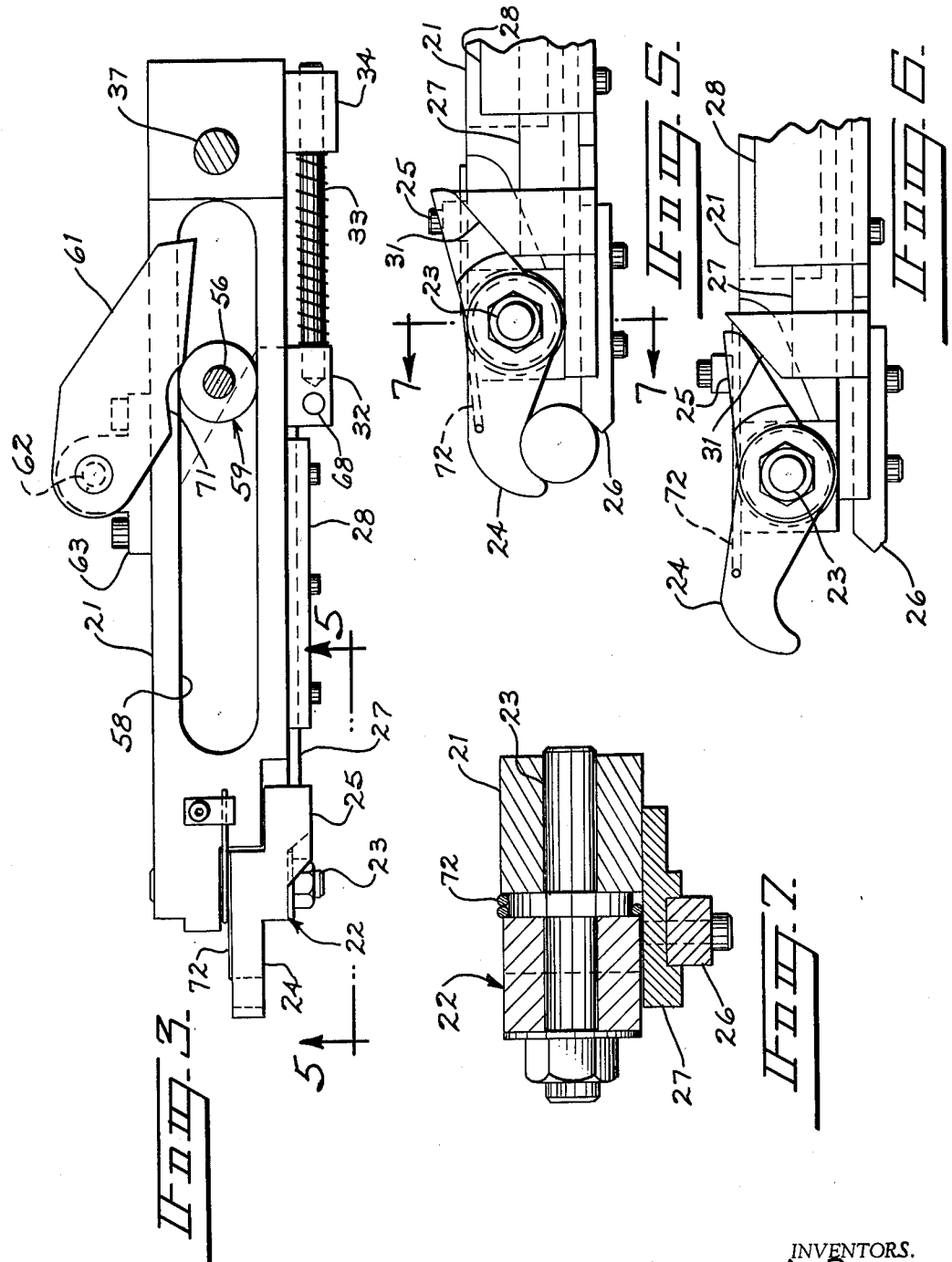
FIG. 3 is a side elevational view of the work transfer arm showing the side adjacent the driving structure for the work transfer arm.

The cam plate 61 is actuated by a ball bearing 69 that surrounds the pin 56 between the bearing 59 and the crank arm 54. The ball bearing 69 is centered between the bearing 59 and the crank arm 54 by a pair of annular spacers 70. The cam plate 61 has a curved surface 71 which receives the roller 69 when the arm is in position shown in FIG. 2. As the roller 69 moves rearwardly from the position shown in FIG. 2, it cams the plate 61 upwardly as shown in FIG. 3. Upward movement of the cam plate 61 rotates the arm 64 to move the slide 27 and thumb 26 rearwardly. At the same time, the cam surface 31 is moved rearward from the position shown in FIG. 5 to the position shown in FIG. 6. This enables a coil spring 72 interpositioned between the finger 24 and the arm 21 to move the finger 24 away from the thumb 26 to release the work piece.

The finger 24 and thumb 26 start to open in the position shown in FIG. 2 wherein the arm 21 is 2½° above horizontal and the crank arm 54 is 7½° from a vertical position. Rotation of the crank arm 54 in a clockwise direction as seen in FIG. 2 causes the crank arm 54 to assume a vertical position and the arm 21 to assume a horizontal position, following which the arm 21 is raised as the bearing 59 is moved toward the inner end of the groove 58. When the crank arm 54 extends downwardly to the left at 45°, the bearing 59 is adjacent the inner end of the groove 58, following which continued rotation of the crank arm 54 causes the bearing 59 to move outwardly.

Figure 13:
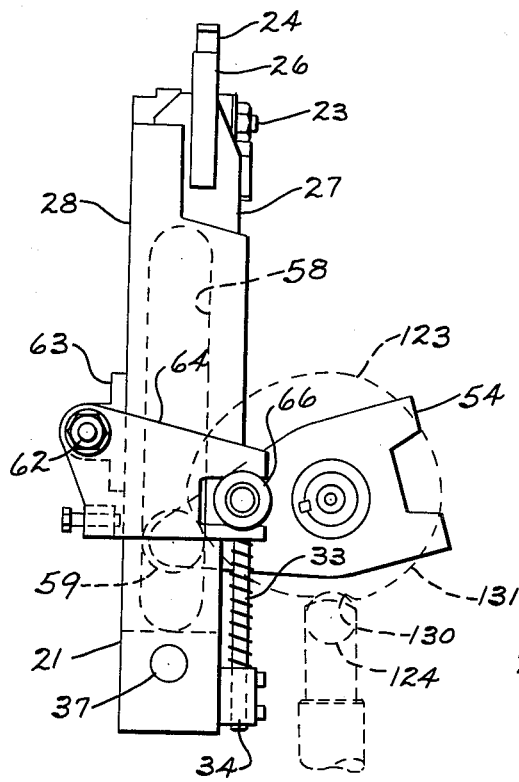
FIG. 13 is a side view of a work transfer arm showing the arm in position 2½° before it reaches its vertical position, and showing, in dotted lines, a cam and cam follower arrangement which is used to smooth the operation of the arm.
Figure 14:
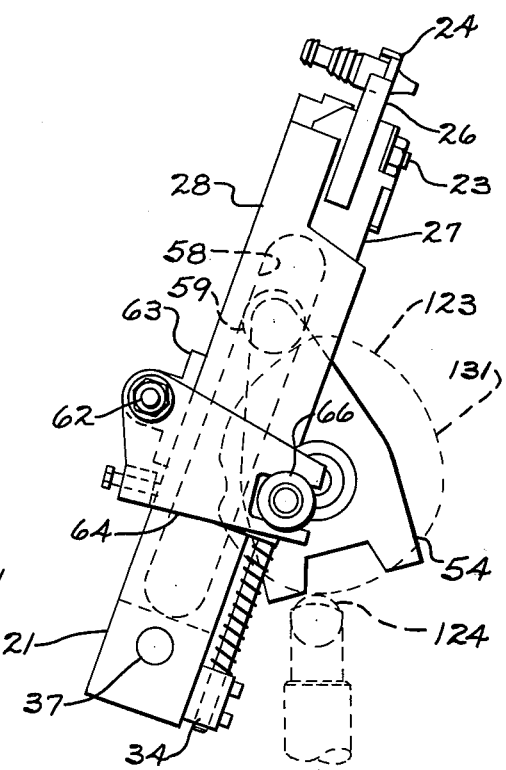
FIG. 14 is a view similar to FIG. 13 but showing the arm in the position which it assumes upon 90° of further cam rotation from the position shown in FIG. 13.
Figure 15:
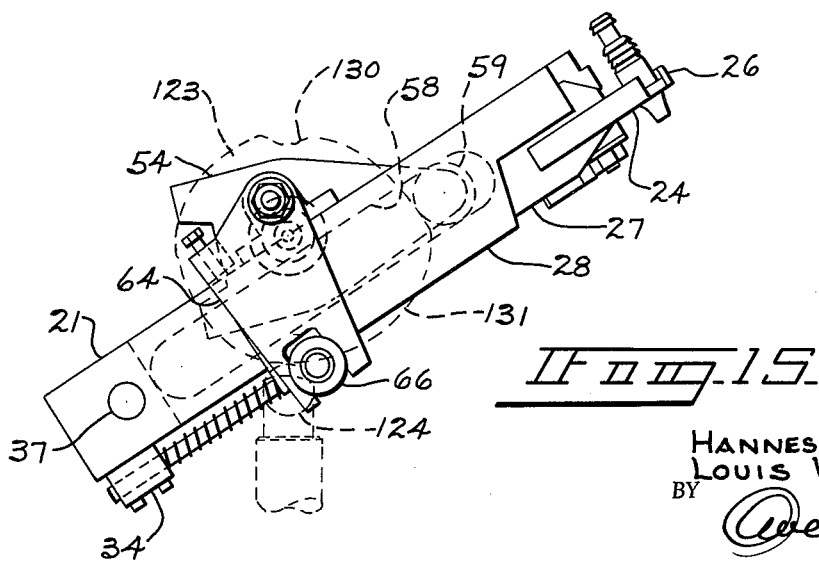
FIG. 15 is a view similar to FIGS. 13 and 14, but showing the arm in the position which it assumes upon an additional 90° of cam rotation from the position shown in FIG. 14.

When the crank arm 54 is in the position shown in FIG. 13, 7½° before its horizontal position, the bearing 69, see FIGS. 8 and 9, rolls into the curved surface 71 in the cam plate 61, see FIG. 3, to enable the spring 35, see FIG. 4 to close the finger 24 and thumb 26. After 7½° of further rotation of the crank arm 54, the arm 21 is vertical, a work piece is gripped by the finger 24 and thumb 26, and the arm 21 starts to move downwardly. It takes three times as long for the arm 21 to be lowered to its horizontal position as it does for the arm to be raised. It will be remembered that the arm 21 was raised from the position of FIG. 2 to the position of FIG. 13 by 90° of rotation of the crank arm 54. The next 90° of rotation of the crank arm 54 lowers the arm 21 to the position of FIG. 14; another 90° of rotation of the crank arm 54 lowers the arm 21 to the position of FIG. 15; and a third 90° of rotation brings the arm 21 back to the position of FIG. 2. During the lowering cycle of the arm, the bearings 59 and 69 are moved forwardly of the cam plate 61 so that the finger 24 and thumb 26 retain their grip on a work piece.

The drive shaft 55 is driven from the interior of the gear box 36 by a suitable structure (not shown). The gear box 36 contains gearing indicated generally at 73 (FIG. 10) operably connected to a fly wheel 74 for the purpose of smoothing out the action of the transfer device 20. The shaft 55 is journaled in the gear box 36 by spaced anti-friction bearings 75 and 76. A collar 77 on the shaft 55 is positioned against the bearing 75, and the bearing 75 is positioned against the shoulder of a counterbored opening 78 to prevent inward movement of the shaft 55. Outward movement of the shaft 55 is prevented by a threaded nut 79 which abuts the bearing 76, and the bearing 76 is seated against the shoulder of a counterbored opening 80 in the far side wall of the gear box 36. An annular dirt seal 81 for the bearing 76 is supported over the nut 79 by an annular retainer 82, and the bearing 75 is protected by an annular dirt seal 83 that is positioned on the collar 77.

The fly wheel 74 is carried by a driven shaft 84 located in the upper end of the gear box 36. The shaft 84 is journaled in ball bearings 85 and 86, and has a gear 87 suitably keyed to the shaft and spaced midway between the bearings by means of annular spacers 88 and 89. The bearing 85 is held in place by an annular retainer 90 bolted in place beneath the fly wheel 74, and the opposite bearing 86 is held in place by a cover member 91 that is bolted to the gear box. The shaft 84 has an enlarged section 92 which fits against the outer face of the bearing 85, and is provided with a threaded nut 93 which is tightened against the inner race of the opposite bearing 86 to hold the shaft in place. A friction plate 94 is positioned against the enlarged section 92 and is provided with an outer facing 95 of a friction lining material. The fly wheel 74 is journaled to a bushing 96 that is keyed to the shaft 84, and another friction plate 97 having a facing of friction material 98 is positioned adjacent the outer face of the fly wheel 74. The fly wheel 74 is sandwiched between the friction plates 94 and 97 by means of a coil spring 99 and a compression adjusting nut 100 threaded onto the shaft 84. The adjusting nut 100 is adjusted so that only a desired amount of inertia is transferred from the fly wheel 74 to the shaft 84, and so that the fly wheel 74 will slip relative to the shaft 84 at peak periods of acceleration and deceleration. The adjusting nut 100 is held in its adjusted position by means of a set screw 101. An annular dirt seal 102 is positioned between the retainer 90 and the enlarged section 92 of the shaft 84.

The gearing 73 which drives the fly wheel shaft 84 comprises a gear 103 keyed to the drive shaft 55 and a pair of gears 104 and 105 that are keyed to an intermediate shaft 106. The gear 104 meshes with the gear 103 on the drive shaft, and the gear 105 meshes with the gear 87 on the fly wheel shaft. The intermediate shaft 106 is journaled on anti-friction bearings 107 and 108 which are held in place by cover members 109 and 110 respectively. The shaft 106 includes an integral collar 111 positioned between the bearing 107 and the gear 104, and the shaft is locked in place by a threaded nut 112 that is tightened against the bearing 108.

It has been found that the inertia of the fly wheel 74 is not enough to completely smooth the operation of the transfer device, inasmuch as the arm is raised quickly and lowered slowly. To offset the cyclic energy needs of the arm 21, a compression spring 113 is provided to impart its energy to the shaft 55 during the raising of the arm 21, and to absorb energy during the lowering of the arm 21. The spring 113 is carried within a tubular sleeve 114 that is guided for vertical movement toward and away from the shaft 55 by means of a guide bushing 115, see FIG. 11. The lower end of the spring 113 is supported on an adjustable pin 116 which is screwed into a boss 117 affixed to the bottom of the gear box 36 by bolts (not shown). The tubular sleeve 114 is held against rotation by a stationary key 118 which fits into a vertical groove 119 in the tubular sleeve. The key 118 is in turn received in the end of a threaded member 120 which is threaded into the gear box 36 and locked in place by a lock nut 121. O-ring seals 122 are provided on both the pin 116 and the threaded member 120 to prevent escape of oil.

Force from the spring 113 is transmitted to the shaft 55 by means of a cam 123 (FIG. 10) fixed to the shaft 55 and a cam follower 124 fixed to the upper end of the tubular sleeve 114. The cam follower 124 comprises an anti-friction bearing 125 held between the bifurcations 126 of the upper end of the sleeve 114 by a threaded machine screw 127. The cam 123 is a plate member that is positioned around and bolted to a bushing 128 which is keyed to the shaft 55 and held in place by a set screw. The internal cavity is filled with oil and a gear 129 is journaled over the hub of the gear 103 and meshes with the gear 105 to carry oil to the upper gears 105 and 87.

The contour of cam 123 is shown dotted in FIGS. 2, 13, 14 and 15. The spring 113 is fully compressed when the crank arm 54 is in the position shown in FIG. 2, i.e. 7½° before it reaches a vertical position. Thereafter the force of the spring 113 exerted against a uniform fall section of the cam 123 tends to turn the crank arm 54 to help overcome the compression of the spring 35 and the shifting movement of the slide 27. Subsequent to this operation, the spring 113 and cam 123 help to overcome the force of gravity on the arm 21 as it is lifted to the position shown in FIG. 13. A depression 130 is provided in the cam surface at such a position as to slow the downward movement of the arm 21 when it reaches the position shown in FIG. 13. For the next 7½° (until the arm 21 reaches a vertical position), the roller 124 rides out of the depression 130 and thereafter the roller 124 starts up a uniform rise section 131 of the cam. The uniform rise section abuts the roller 124 until the arm 21 is lowered into the position shown in FIG. 2. In order that the cam 123 can be accurately positioned with respect to the arm 21, the crank arm 54 is provided with an opening 132 therethrough (FIG. 10) which receives the axial projection 133 of a hub 134 that is keyed to the shaft 55. The hub 134 includes a radial flange portion 135 against which the arm 54 is positioned. The arm 54 is affixed to the flange 135 by bolts 136 (FIG. 2) which extend through slotted holes 137 in the arm 54 and which enable adjustment of the position of the arm 54 relative to the cam 123.

The arm 21 is swung between vertical and horizontal positions by means of the arm 54 and its roller 59 which rides between the opposing surfaces of the groove 58. The arm 54 is rotated in a clockwise direction as seen in FIG. 2 and the roller 124 bears against the high point of the cam 123 at the time the crank arm is 7½° out of its vertical position. At this time, the transfer arm 21 is approximately 1° above its horizontal position and the roller 69 on the crank arm is in engagement with the curved surface 71 of the cam plate 61. During the next 7½° of crank rotation, the cam plate 61 is biased upwardly to swing the depending lever 64 to the left as seen in FIG. 2 to cause the slide 27 and its thumb 26 to move rearwardly. Rearward movement of the slide 27 causes its camming surface 31 to move away from the rear portion 25 of the work engaging finger 22 to enable the coil spring 72 to move the thumb 26 to the position shown in FIG. 6. This movement releases the work piece into the work carrier. Thereafter, continued clockwise rotation of the crank arm 54 causes the roller 59 to move towards the left end of the groove 58 and thereby raise the arm 21 towards the position shown in FIG. 13. When the crank arm 54 reaches a position 7½° below horizontal, the transfer arm 21 again is approximately 1° out of vertical, and the roller 69 rides into the curved surface 71 of the cam plate 61 to cause the slide 27 along with its thumb 26 to move forwardly and the finger 24 to be rotated towards the thumb 26 to pick up another work piece. At the same time, the roller 124 rides into a depression 130 to slow up the swinging movement of the arm. The next 7½° of rotation brings the arm 21 to its vertical position and thereafter the arm 21 starts to swing downwardly towards its unloading position. During this downward movement, the cam follower 124 rides on a rising portion 131 of the cam which causes a compression of the spring 113. The force tending to cause rotation of the shaft 55 by reason of the weight of the arm 21 is offset by the force necessary to compress the spring 113. Downward movement of the arm 21 continues through the position shown in FIGS. 14 and 15 until it reaches the position shown in FIG. 2 wherein the finger 24 and the thumb 26 are caused to open to release the work piece.

During the rotation of the drive shaft 55, its gear 103 turns the gear 104 that is keyed to the intermediate shaft 106 which in turn causes rotation of the gear 105 and, in turn, of the gear 87 on the upper shaft 84. Rotation of the shaft 84 causes rotation of the friction plate 94 which in turn causes rotation of the fly wheel 74. The inertia effect of the fly wheel 74 helps to smooth the swinging action of the transfer arm 21.

The work carrier that is loaded with work pieces by the work transfer device, preferably has a plurality of longitudinally extending rows of work receiving openings therein. The individual openings of the longitudinal rows are spaced in transverse rows at right angles to the longitudinal rows. The work carrier to be loaded can be placed on a table which indexes laterally to bring succeeding openings in a transverse row into a position to be loaded by the work transfer device. The loading operation can start with the outermost opening of a transverse row. After a transverse row is filled, the work carrier can be indexed longitudinally and laterally to bring the outermost opening of the next transverse row of openings into position to be loaded by the work transfer device. This indexing operation is continued until the work carrier is filled.

The embodiment of work transfer arm shown in FIG. 16 is generally similar to that previously described and differs therefrom principally in the finger and thumb arrangement that is used to grip the work piece. Those portions of FIG. 16 which correspond to similar portions of the previously described embodiment are designated by a like reference numeral wtih a prime mark affixed thereto. The supporting and driving structure for the work transfer arm is identical with that previously described.

A thumb 200 and a finger 201 are pivoted adjacent their centers to the pin 23' and are held in place by a nut 202. The outer ends of the thumb 200 and finger 201 serve to grip a work piece, and the other ends of the thumb 200 and finger 201 serve as actuating levers 203 and 204 for the thumb and finger. The actuating levers 203 and 204 are biased apart by a coil spring 205, and outward movement of the levers 203 and 204 is limited by pins 205 and 206. When the levers are in engagement with the pins 205 and 206 the thumb 200 and finger 201 are in their work releasing position. The thumb 200 and finger 201 are caused to grip a work piece by squeezing the actuating levers 203 and 204 together. In the embodiment shown in FIG. 16 the levers 203 and 204 are squeezed together by a V-shaped cam structure 207 which is carried by the slide 27'. The cam structure 207 has a pair of camming surfaces 208 and 209 which abut and cam together the levers 203 and 204 when the slide 27' is moved outwardly toward the thumb and finger.

It will be apparent that the objects heretofore enumerated as well as others have been accomplished, and that there has been provided a new and improved work transfer arm having a finger and thumb arrangement which smoothly picks up work at a loading station and transfers it to an unloading station where the finger and thumb release the work, following which the arm travels back to the loading station to repeat the cycle.

While the invention has been described in considerable detail, it is not limited to the particular embodiments shown and described; and it is intended to cover hereby all novel adaptations, modifications, and arrangements thereof which come within the practice of those skilled in the art to which the invention relates.

What we claim is:

1. A work transfer device comprising: a support structure, a pivot shaft extending out of said support structure, a work transfer arm pivotally supported by said pivot shaft, a rotatable drive shaft carried by said support structure generally parallel to said pivot shaft, a crank arm carried by said rotatable drive shaft, said crank arm having laterally extending drive means for slidingly engaging opposed guide surfaces, said work transfer arm having a pair of opposed guide surfaces for said drive means extending longitudinally of said arm, said guide surfaces being so shaped that rotation of said crank arm causes reciprocating partial rotation of said crank arm about said pivot shaft between raised and lowered positions, a cam on said drive shaft, a cam follower biased against said cam, said cam presenting a falling section of its surface against said cam follower during the time said work transfer arm is being raised and presenting a rising section of its surface against said cam follower during the time said work transfer arm is being lowered.

2. A work transfer device comprising: a work transfer arm having an outer end, a finger lever projecting from the outer end of said work transfer arm, said finger lever being pivoted adjacent its center to said arm about a first predetermined axis, a slide on said arm mounted for movement toward and away from the outer end of said arm, a thumb carried by said slide projecting opposite said finger lever and cooperable therewith in one relative position in workpiece engaging relationship, means resiliently urging said finger lever rotationally away from said thumb, cam means positioned between said slide and said finger lever for rotating said finger lever toward said thumb when said slide is moved toward the outer end of said arm, pivot means supporting said arm at a point spaced from the outer end thereof for rotation about a second axis extending generally at right angles to said first predetermined axis, a drive shaft parallel to the second axis, a crank arm on said drive shaft, said crank arm having laterally extending drive means for slidingly engaging opposed guide surfaces, said work transfer arm having a pair of opposed guide surfaces for said drive means extending longitudinally of said arm between said pivot means and the outer end of said arm, said guide surfaces being so shaped and positioned that rotation of said crank arm causes oscillation of said drive means relative to said work transfer arm and reciprocating partial rotation of said arm about said pivot means between generally horizontal and generally vertical positions, means actuated by said crank arm for actuating said slide at predetermined positions of said crank arm to move said thumb toward said finger, a cam on said drive shaft, a cam follower biased against said cam, said cam presenting a falling section of its surface against said cam follower during the time said transfer arm is being raised between said generally horizontal and generally vertical positions and presenting a rising section of its surface against said cam follower when said work transfer arm is being lowered between said generally vertical and said generally horizontal positions.

3. A work transfer device comprising: a work transfer arm having an outer end, a finger lever projecting from the outer end of said work transfer arm, said finger lever being pivoted adjacent its center to said arm about a first predetermined axis, a slide on said arm mounted for movement toward and away from the outer end of said arm, a thumb carried by said slide projecting opposite said finger lever and cooperable therewith in one relative position in workpiece engaging relationship, means for rotating said finger lever toward said thumb when said slide is moved toward the outer end of said arm, and for rotating said finger lever away from said thumb when said slide is moved away from said outer end of said arm, pivot means supporting said arm at a point spaced from the outer end thereof for rotation about a second axis extending generally at right angles to said first predetermined axis, a drive shaft parallel to the second axis, a crank arm on said drive shaft, said crank arm having laterally extending drive means for slidingly engaging opposed guide surfaces, said work transfer arm having a pair of opposed guide surfaces for said drive means extending longitudinally of said arm between said pivot means and the outer end of said arm, said guide surfaces being so shaped that rotation of said crank arm causes oscillation of said drive means relative to said work transfer arm and reciprocating partial rotation of said arm about said pivot means, and means actuated by said crank arm for actuating said slide at predetermined times to actuate said thumb and said finger lever.

4. A work transfer device comprising: a work transfer arm having an outer end, a finger lever projecting from the outer end of said work transfer arm, said finger lever being pivoted adjacent its center to said arm about a first predetermined axis, a slide on said arm mounted for movement toward and away from the outer end of said arm, a thumb carried by said slide projecting opposite said finger lever and cooperable therewith in one relative position in workpiece engaging relationship, means for rotating said finger lever toward said thumb when said slide is moved toward the outer end of said arm, and for rotating said finger lever away from said thumb when said slide is moved away from said outer end of said arm, pivot means supporting said arm at a point spaced from the outer end thereof for rotation about a second axis extending generally at right angles to said first predetermined axis, a drive shaft parallel to the second axis, a crank arm on said drive shaft, said crank arm having a laterally extending pin which carries roller means for slidingly engaging opposed guide surfaces, said work transfer arm having a longitudinally extending groove therein forming a pair of opposed guide surfaces for said roller means extending longitudinally of said arm between said pivot means and the outer end of said arm, said guide surfaces being so shaped that rotation of said crank arm causes oscillation of said roller means in the groove of said work transfer arm and reciprocating partial rotation of said arm about said pivot means, and means actuated by said crank arm for actuating said slide at predetermined times to actuate said thumb and said finger lever.

5. A work transfer device comprising: a work transfer arm having an outer end, a finger lever projecting from the outer end of said work transfer arm, said finger lever being pivoted adjacent its center to said arm about a first predetermined axis, a slide on said arm mounted for movement toward and away from the outer end of said arm, a thumb carried by said slide projecting opposite said finger lever and cooperable therewith in one relative position in workpiece engaging relationship, means resiliently urging said finger lever rotationally away from said thumb, cam means positioned between said slide and said finger lever for rotating said finger lever toward said thumb when said slide is moved toward the outer end of said arm, pivot means supporting said arm at a point spaced from the outer end thereof for rotation about a second axis extending generally at right angles to said first predetermined axis, a drive shaft parallel to the second axis, a crank arm on said drive shaft, said crank arm having laterally extending drive means for slidingly engaging opposed guide surfaces, said work transfer arm having a pair of opposed guide surfaces for said drive means extending longitudinally of said arm between said pivot means and the outer end of said arm, said guide surfaces being so shaped that rotation of said crank arm causes oscillation of said drive means relative to said work transfer arm and reciprocating partial rotation of said arm about said pivot means, cam means carried by said transfer arm, said cam means being engaged and actuated by said drive means of said crank arm in a predetermined oscillating position thereof, and means operatively associated with said cam means and effective to move said slide to actuate said thumb and said finger lever when said cam means is engaged by said drive means.

References Cited by the Examiner

UNITED STATES PATENTS

| | | | |
|---|---|---|---|
| 1,432,853 | 10/1922 | Hanson | 74—48 |
| 1,846,340 | 2/1932 | Jones | 74—48 |
| 2,901,126 | 8/1959 | Halberstadt. | |
| 3,104,765 | 9/1963 | Campbell. | |

GERALD M. FORLENZA, *Primary Examiner.*

MARVIN A. CHAMPION, *Examiner.*